Nov. 29, 1966  J. W. HENDRY  3,288,903

METHOD FOR PLASTICIZING AND MOLDING

Filed May 10, 1963  3 Sheets-Sheet 1

INVENTOR.
JAMES W. HENDRY
BY
Woodhams, Blanchard & Flynn
ATTORNEYS

Nov. 29, 1966  J. W. HENDRY  3,288,903
METHOD FOR PLASTICIZING AND MOLDING
Filed May 10, 1963  3 Sheets-Sheet 2
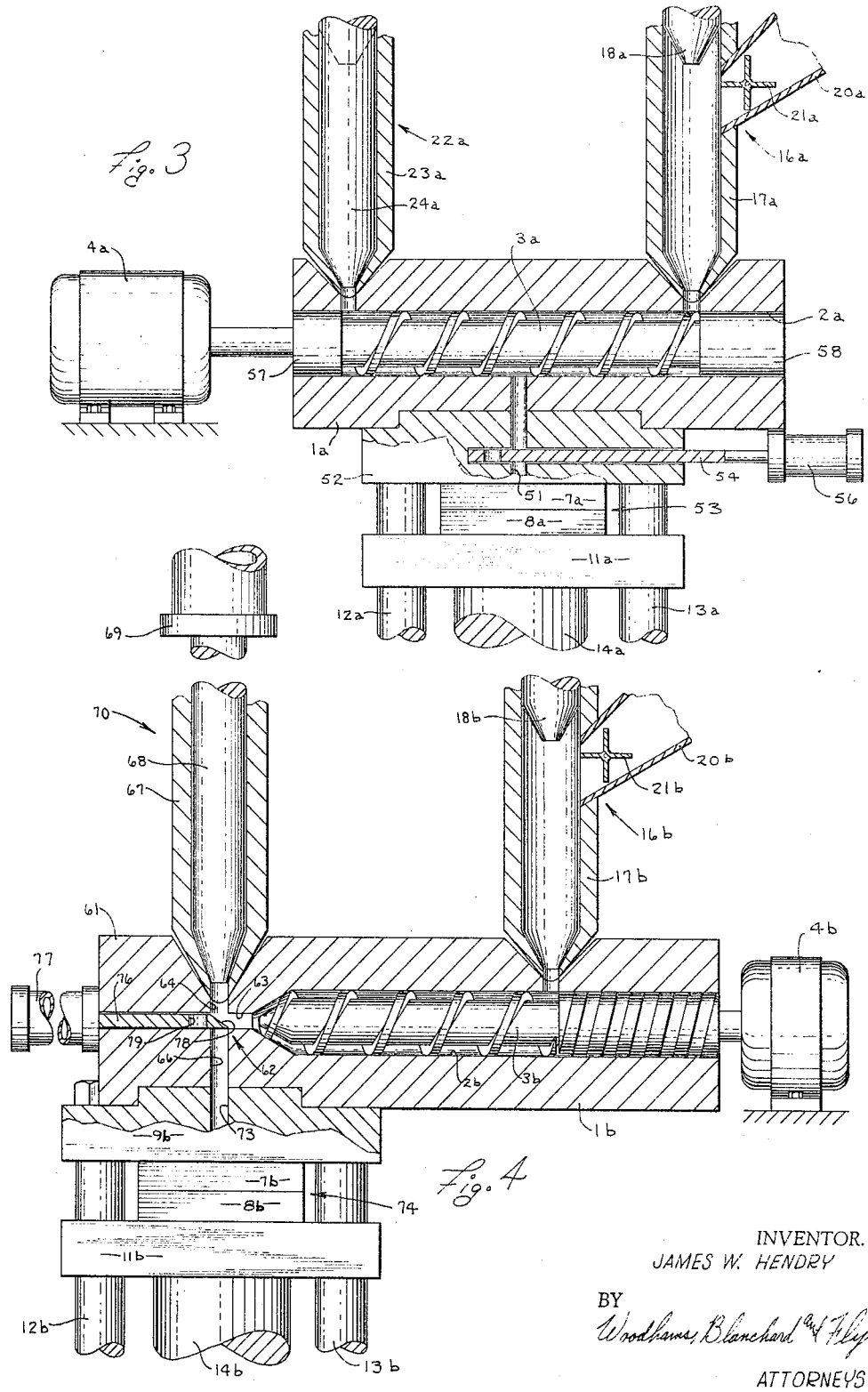
INVENTOR.
JAMES W. HENDRY
BY
Woodhams, Blanchard and Flynn
ATTORNEYS Nov. 29, 1966   J. W. HENDRY   3,288,903
METHOD FOR PLASTICIZING AND MOLDING
Filed May 10, 1963   3 Sheets-Sheet 3
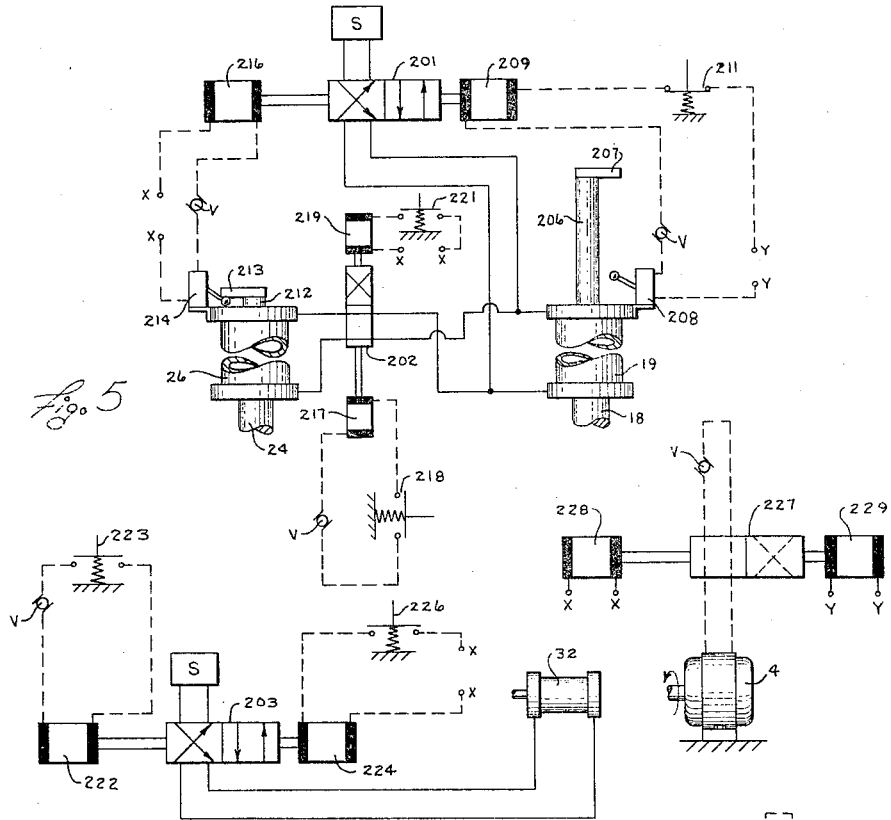
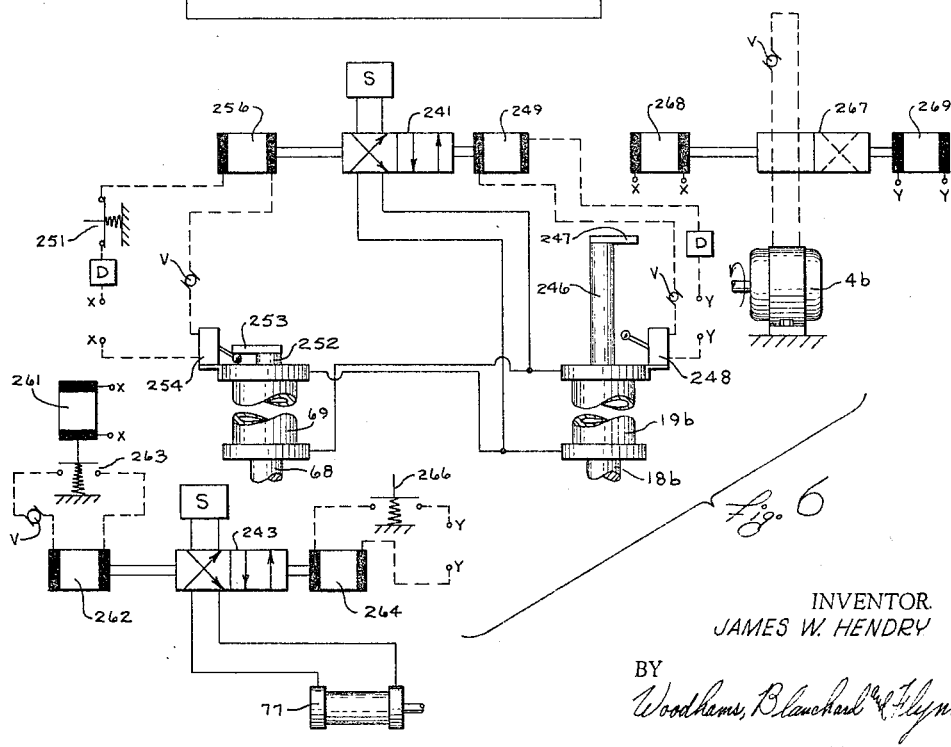
INVENTOR.
JAMES W. HENDRY
BY
Woodhams, Blanchard & Flynn
ATTORNEYS

United States Patent Office 3,288,903
Patented Nov. 29, 1966

3,288,903
METHOD FOR PLASTICIZING AND MOLDING
James W. Hendry, Scottsburg, Ind., assignor to Borg-Warner Corporation, Chicago, Ill., a corporation of Illinois
Filed May 10, 1963, Ser. No. 279,539
6 Claims. (Cl. 264—329)

This invention relates to a method, and apparatus for performing such method, of plastic molding and particularly to such a method by which the character and amount of plasticizing of the plastic material prior to molding thereof may be chosen through a wide range of possibilities whereby a single molding machine may be utilized as desired to handle a wide variety of plastic materials.

It is well known by those skilled in the molding of plastic materials, that the amount and character of plasticizing of the material prior to the actual molding thereof is extremely critical to the obtaining of a satisfactory molding. It is equally well known that plastic materials of different kinds vary widely in their plasticizing requirements, capabilities and characteristics, such as the minimum temperature at which the plasticizing operation must be carried out, the maximum temperature at which the plasticizing operation may be carried out, the time period during which the plasticizing material may be subjected to any particular temperature, the amount and nature of mechanical working which must or may be applied to said plastic material for appropriate preparation thereof and other generally similar and variable conditions. It follows therefore, as is well recognized, that a given machine designed and adapted to handle a particular type of plastic material will often have relatively little applicability for plastic materials of other and different characteristics. This is especially true of the screw-type pre-plasticizing machine wherein the plastic material is prepared for molding by a combination of mechanical working and heating applied thereto by a rotating screw prior to its delivery to a molding device. Such molding machines have long been known in the art, one of the earlier ones thereof being illustrated by the patent to Goldhard, No. 2,505,540.

Plastic molding machines of the type just mentioned have received a great deal of experimental attention and are in commercial use to at least a limited extent. However, such use is normally limited to situations where a large number of parts are to be molded from the same material, or from materials having at least similar plasticizing characteristics, and wide-spread use of this type of molding equipment is prevented, or at least discouraged, by the excessive cost of the alternate plasticizing units needed to adapt such machines to use with plastic material requiring different amounts and kinds of preparation as above set forth. It has, therefore, been hitherto often impractical to obtain the many recognized advantages of this general type of machine, and the molding technique employed thereby, in the more frequent and commonly encountered situations where a variety of plastic materials are handled by a given machine at different times during its normal operational life.

Accordingly, the objects of the invention include:

(1) To provide a method which can be readily modified as required to accommodate plastic materials of varying preparation and molding characteristics.

(2) To provide a method, as aforesaid, which can be practiced by a variety of machines of varying degrees of complexity, according to the precision of control desired.

(3) To provide a machine, as aforesaid, which will be sufficiently similar to previously known screw-type pre-plasticizing machines that operators familiar with such machines will not require excessive additional training to operate machines built according to the invention.

Other objects and purposes of the invention will become apparent to persons acquainted with methods and apparatus of this general type upon reading the following specification and inspecting the accompanying drawings.

In the drawings:

FIGURE 3 is a side elevational view, partially in central section, of a further modified apparatus for performing the method of the invention.

FIGURE 4 is a side elevational view, partially in central section, of a still further modified apparatus for performing the method of the invention.

FIGURE 5 is a schematic diagram of a control system for the embodiment of FIGURE 1.

FIGURE 6 is a schematic diagram of a control system for the embodiment of FIGURE 4.

General description

Figure 2:
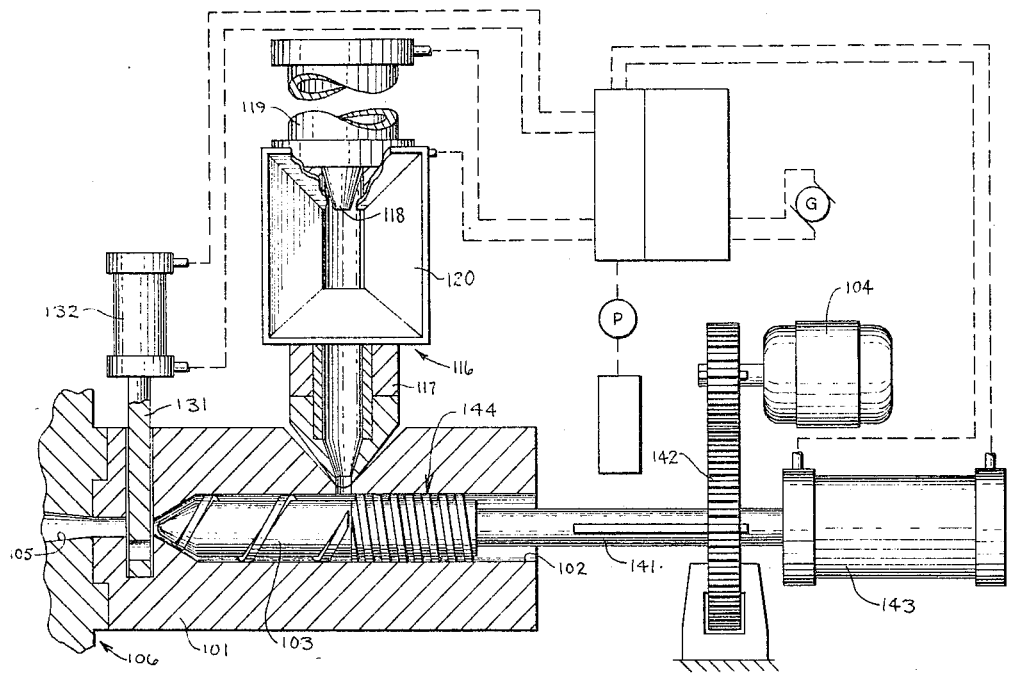
FIGURE 2 is a top elevational view, partially in central section, of a modified apparatus for performing the method of the invention.

Generally speaking, the method of the invention comprises first working a quantity of plastic material from a feeding zone through a relatively short agitating zone into a storage chamber and next returning said plastic material from said storage chamber back through said agitating zone. This may be repeated as often as needed until the plastic material is in proper condition for molding. The material is then molded in whatever manner as desired, either by injection or extrusion techniques.

In providing apparatus for carrying out such method, one particular advantageous example comprises providing ram-type feeding means discharging into a rotatable screw which in turn discharges into the storage chamber. Such storage chamber may be provided in any of several ways, such as by a cylinder communicating with the screw chamber and having a retractable ram therein, by retraction of the screw itself or by discharging into another screw chamber. In a preferred embodiment of the apparatus a chamber having a reciprocable ram therein communicates with the screw chamber near the discharge end thereof.

Suitable flow and other control means are provided so that said plastic material may be passed back-and-forth between said feeding zone and said storage chamber, by alternate operation of the rams, as many times as is needed to prepare same properly for molding. The speed and direction of rotation of said screw is prferably adjustable as needed to control the amount and degree of agitation of the plastic material as it passes in either direction between the feeding zone and the storage chamber. When said plastic material is ready for molding, it may be driven to or through suitable molding means (normally a mold but conceivably an extrusion die) as desired under the impelling force of either of said rams. Normally, said screw will be of sufficiently small volumetric capacity that it will hold less than one charge of plastic material at any one time whereby no plastic material is held within said screw for a period of time greater than one cycle of operation of the machine. However, where an unusually great amount of agitation of material is required, and the material has sufficient stability to permit its being exposed to a plasticizing temperature for a time period greater than one cycle of operation, said screw may be made as much longer as required without departing from the broader aspects of the invention.

Detailed description

In the following description the method aspects of the invention will for convenience be referred to and illustrated by certain specific embodiments of apparatus capable of practicing said method. However, the use of such specific apparatus for illustrating the invention should be clearly recognized as for illustrative use only and carries no implication that the practice of the method is in any way confined to the particular items of apparatus shown or that the apparatus aspects of the invention are confined to the method described.

Further, in connection with the apparatus, it will be understood that certain reference terms will be employed for convenience only and will have no limiting significance. For example, the terms "upwardly" and "downwardly" will refer to directions taken with respect to the normal position of use of such machines which reference will also be upwardly and downwardly of the drawings as appearing in FIGURES 1, 3 and 4. The terms "rightwardly" and "leftwardly" will be used with reference to the particular drawings in connection with such terminology as used. The terms "inwardly" and "outwardly" will refer to directions toward and away from the geometric center of the apparatus.

Such terms will also include derivatives of the words above specifically mentioned as well as other terms of generally similar import. The term "mold" will normally refer to an ordinary plastic mold of any applicable type but should also be recognized in some instances as including other plastic-shaping means such as an extrusion die.

Figure 1:
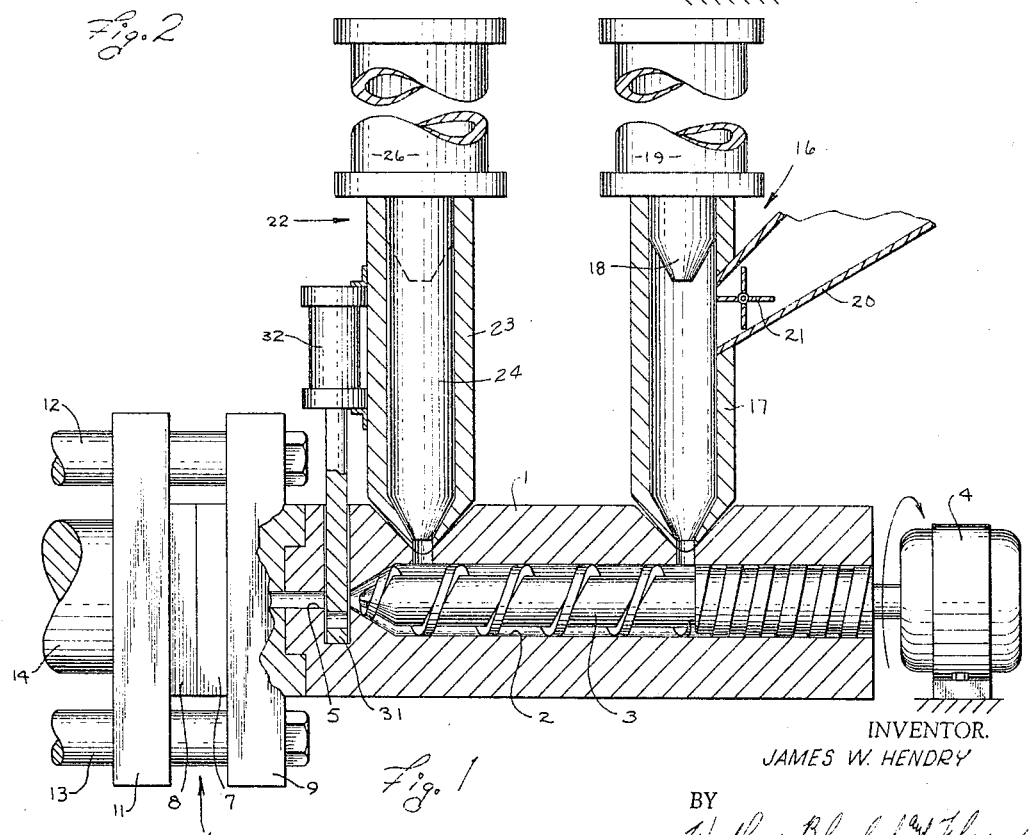
FIGURE 1 is a side elevational view, partially broken away in central section, of apparatus embodying the invention and capable of carrying out the method thereof.

Turning now to the drawings and particularly to FIGURE 1, there is provided a relatively short housing 1 having a central opening 2 therein which opening is occupied by a rotatable screw 3. Any convenient means such as the motor 4 is indicated for rotating said screw. The housing 1 is supported in any convenient manner upon a suitable base, not shown. The screw 3 discharges first through the leftward or discharge end of the central opening 2, and hence through a discharge nozzle opening 5, into a mold 6 having the usual fixed and movable mold halves 7 and 8, respectively. A gate 31 may be actuated by a fluid pressure cylinder 32 to block or open the nozzle opening 5. The fixed mold half 7 is in the conventional manner supported upon a fixed platen 9 through which the nozzle opening 5 extends and movable mold half 8 is supported upon a movable platen 11. The fixed platen 9 may be mounted in any of several convenient ways, such as upon suitable strain rods of which two appear at 12 and 13 and the movable platen 11 is slidably mounted upon said rods for movement with respect to movement of a plunger 14. Said plunger 14 may be reciprocably actuated by any convenient means, such as hydraulic means.

A feeding device 16 is provided at a point on the housing 1 remote from the discharge end thereof. The feeding device 16 may be of any one of many conventional types of feeding devices, provided only if it is capable of feeding material to the screw 3 under a controllable amount of positively applied pressure. One acceptable form is illustrated by a ram cylinder 17 and a ram 18 contained therein, which ram is reciprocable by any convenient means, such as the fluid pressure cylinder 19. The ram cylinder 17 is fed by any convenient means, such as the hopper 20, here shown for purposes of illustration as having a closure and metering device 21, operable by any convenient means, not shown, at the outlet thereof for controlling the output thereof and for preventing interaction between semiplasticized material in the ram cylinder 17 and material in the hopper 20.

A storage device 22 is provided adjacent the discharge end of the extrusion housing 1 and includes a second ram cylinder 23, a second ram 24 and a second fluid pressure cylinder 26 each of which is preferably identical with its counterpart in the feeding device 16.

Operation of FIGURE 1 form

With plastic material introduced in any convenient manner, such as from the hopper 20, into the ram cylinder 17 below the first ram 18, and with the screw 3 rotating in the direction indicated by the arrow, the fluid pressure cylinder 19 is made to move the ram 18 downwardly and drive said plastic material out of the cylinder 18 and into an agitating zone provided within the housing 1 by the portion of opening 2 between the feeding device 16 and the storage device 22 together with the screw 3 therein. Such material is then agitated by, and simultaneously advanced through, the screw 3 leftwardly as appearing in FIGURE 1, said advancing being primarily in response to pressure exerted by the first, or feeding, ram 18 but assisted if desired by appropriate rotation of the screw 3. The rate of such rotation will be determined by the amount of agitating desired even, in an extreme case, where a very high degree of agitation is required, to the extent of providing the screw with a substantial clearance and rotating same in a direction opposing the flow of plastic material therethrough whereby such flow is maintained only by the pressure of said ram 24 on the plastic material. The gate 31 is closed by suitable actuation of the cylinder 32 whereby said material cannot move through the nozzle opening 5. The ram 24 may either be in a retracted position as shown in dotted lines in FIGURE 1 or it may be in a downward position but de-pressurized so as to be movable upwardly in response to pressure imposed by the plastic material against its lower end. Thus, the plastic material advanced leftwardly through the screw 3 will be driven upwardly into the cylinder 22.

When the ram 18 is in its fully downward position, it may be either de-pressurized or lifted by the fluid pressure cylinder 19. The ram 24 is now driven downwardly by the fluid pressure cylinder 26 and drives plastic material within the ram cylinder 23 back into the agitating zone of housing 1 and again through the screw 3 back into the cylinder 16. The screw 3 will normally be reversed simultaneously with the downward actuation of the ram 24 but its direction and speed of rotation are chosen as desired to provide the kind and amount of agitation needed. The plastic material may be passed back and forth between said cylinders in the above described manner as many times as needed to render it into the proper condition for molding.

While the relative capacities of said cylinders 16 and 22, as compared to the capacity of that portion of the housing 1 located between said cylinders, will vary according to requirements of the apparatus, normally the capacity of said two cylinders will be equal to each other and equal to or slightly greater than the capacity of that portion of the screw housing 1 located between the cylinders. Thus, the amount of plastic material passed back and forth between the ram cylinders 17 and 23 will be fully agitated and prepared for molding. When this condition is attained the cylinder 32 will be energized to open the gate 31, and rams 18 and 24 will be moved to their fully downward positions to insure that all of the plastic material is in the housing 1. Meanwhile the motor 4 will be energized to rotate the screw 3 in a direction to move the material leftwardly again usually with help of the ram 18, through the nozzle opening 5 to inject same into the mold 6.

Since the variables in both plasticizing time and degree of agitation can be varied by the method and apparatus of the invention, it will be recognized that the invention may be applicable to a wide variety of plastic materials without changes in a specific machine other than in its controls. For example, in a given case the time of pre-plasticizing will be controlled by the number of times that the material is passed back and forth between the cylinders 16 and 22. The degree of agitation will be determined by the direction and rate of rotation of the screw 3 while such material is travelling from one ram cylinder to the other. Thus, if a minimum degree of agitation is desired, the screw 3 may be rotated at such a speed in relation to the pressure exerted by the downwardly energized one of the rams that the material merely passes from one ram cylinder to the other solely in response to the pressure of such one ram and with virtually no agitation. At the other extreme, the screw 3 may be rotated in a direction to oppose the travel of the material from one ram cylinder to another and thus there may be applied a maximum of agitation. Thus, material may be given an extremely high degree of agitation for a short period of time or a very minimum amount of agitation over a longer period of time or any other combination as may be desired. After such preplasticizing has been completed, material is then ejected into the mold 6 or through an extrusion die or otherwise formed into the desired shape in a convenient manner.

FIGURE 5 discloses schematically an example of a control system usable with the embodiment of FIGURE 1 for giving the operation essentially as above described. In FIGURE 5 the rams 18 and 24 are considered to be double ended rams having ends extending upwardly through their respective fluid pressure cylinders 19 and 26 for feedback purposes as hereinafter described. Furthermore, the pressure cylinders 19 and 26 are double acting cylinders whereby the rams are returned upwardly thereby rather than by the force of plastic material flowing into the ram cylinders. The control system shown allows some plastic material to remain in the central opening 2 at all times when said material is being passed back and forth between the feeding devices but allows the central opening 2 to be emptied during the ejection of plastic material into the mold 6.

A pressure fluid source S connects through a reversing valve 201 to the fluid pressure cylinders 19 and 26 whereby when one of the rams is being raised the other is normally being lowered.

The top end of the ram 18 is provided with an extension 206 through the top of the fluid pressure cylinder 19 which has an actuating finger 207 thereon for actuating a limit switch 208 when the ram 18 reaches its lowermost position. The limit switch 208 is in series with the source of voltage V, a solenoid 209 which is capable of pushing the reversing valve 201 leftwardly, a normally closed eject switch 211 and a set of terminals Y—Y across which are connected means hereinafter described. The ram 24 has an extension 212 extending upwardly through the top of the fluid pressure cylinder 26 and having an actuating finger 213 thereon for actuating a limit switch 214 when the ram 24 is in its lowermost position. The limit switch 214 is in series with a source of voltage V, a solenoid 216 capable of moving the reversing valve 201 rightwardly to its position shown in FIGURE 5 and a pair of terminals X—X connected to means hereinafter described. A second reversing valve 202 is provided across the lines to the fluid pressure cylinder 26 for purposes appearing hereinafter. The reversing valve 202 is moved upwardly to its position shown in FIGURE 5 by a solenoid 217 which is connected in series with a source of voltage V and a normally open reset switch 218. The reversing valve 202 is moved downwardly from its position shown in FIGURE 5 by means of a solenoid 219 which is connected in series with a normally open eject switch 221 and the terminals X—X.

A source of fluid pressure S is also connected through a reversing valve 203 to the gate fluid pressure cylinder 32. The reversing valve 203 is moved leftwardly to its position shown in FIGURE 5 by a solenoid 222 which is in series with a source of voltage V and a normally open reset switch 223. The reversing valve 203 is moved leftwardly from its position shown by the solenoid 224 which is connected in series with a normally eject switch 226 and the terminals X—X.

The motor 4 is fed from a source of voltage V through a reversing switch 227 whereby the direction of rotation of the motor may be reversed. The reversing switch 227 is actuatable to allow the motor 4 to turn in the direction indicated in FIGURE 1 by a solenoid 228 which is energized through the terminals X—X and is actuatable by a solenoid 229 connected to the terminals Y—Y to reverse the rotation of the motor 4.

Assuming the apparatus to be in its position shown in FIGURE 5, assuming the sources of pressure fluid and voltage to be energized and further assuming that the ram cylinder 17 has been charged with plastic material, pressure fluid from the source S will flow through the reversing valve 201 to drive the ram 18 downwardly and the ram 24 upwardly so that the plastic material in the ram cylinder 17 will be expelled therefrom, through the screw 3 and into the ram cylinder 23. When the ram 18 reaches its lowermost position, the limit switch 208 is closed to activate the solenoid 209 for reversing the reversing valve 201 and for activating the solenoid 229 to reverse the motor 4.

Reversal of the reversing valve 201 causes a reversal of movement of the rams 18 and 24 whereby the ram 24 is moved downwardly to expel the plastic material within the ram cylinder 23 into the central opening 2. Reversal of the motor 4 causes the screw 3 to assist the movement of the plastic material rightwardly back into the ram cylinder 17. When the ram 24 reaches its lowermost position the limit switch 214 is closed actuating the solenoid 216 to return the reversing valve 201 to its starting position shown in the drawing whereby the ram 18 is caused to move downwardly and the ram 24 is caused to move upwardly as hereinabove described. Cycling of the type immediately hereinabove described continues until the operator elects to eject the plastic material into the mold 6. The control device causes ejection of the material from the screw 3, said screw having been loaded by the ram 18.

The ejection of the plastic material may be selected at any time regardless of the positions of the rams by actuation of the eject switches 211, 221 and 226, said actuation being either manually by the operator or automatically by a suitable timer or other means as desired. For example, assuming that the eject buttons are actuated when the ram 24 is nearing its lowermost position whereby the limit switch 214 is closed, closing the eject switch 221 with the limit switch 214 closed, will actuate the solenoid 219 whereby the reversing valve 202 is moved downwardly to reverse the fluid flow to the fluid pressure cylinder 26 thereby cancelling the reversing effect of the reversing valve 201 on the cylinder 26. Thus, the ram 24 is held in its lowermost position to block the entrance of plastic material into the ram cylinder 23 and to hold the limit switch 214 closed. Simultaneously, closing the limit switch 214 impresses a voltage across the solenoid 228 to return the motor 4 to its direction of rotation indicated in the drawing whereby plastic material tends to be moved by the screw 3 leftwardly. The aforementioned returning of the reversing valve 201 to its position shown in the drawing moves the ram 18 to expel plastic material contained in the ram cylinder 17 into the leftwardly moving screw 3. Also simultaneously with the closing of the limit switch 214 and assuming the eject switch 226 to be closed, a signal is impressed from the terminals X—X upon the solenoid 224 whereby the reversing valve 203 is moved leftwardly to reverse the pressure fluid flow to the gate cylinder 32 whereby to open the gate 31. Thus, plastic material in the screw 3 is moved leftwardly through the nozzle 5 and into the mold 6.

When the ram 18 reaches its lowermost position, the limit switch 208 will be closed. However, due to the open condition of the eject switch 211 no signal will be impressed upon the solenoid 209 or upon the terminals Y—Y and therefore no change will occur in the direction of motor rotation or ram actuation. Thus, the ram 18 also remains in its downwardmost position and the motor 4 continues to rotate the screw 3 in such manner as to move any material therein leftwardly into the mold 6.

Upon completion of ejection of material from the screw 3, the operator may release the eject switches 221 and 226. This will open the circuits of the solenoids 219 and 224, respectively, but will have no effect upon the positioning of the reversing valves 202 and 203. The operator may then actuate the reset switches 218 and 223 whereby the solenoids 217 and 222, respectively, are actuated to return the reversing valve 202 upwardly to the position shown in the drawing and to return the reversing valve 203 rightwardly to its position shown in the drawing, respectively. Returning the reversing valve 202 allows pressure fluid flow to the fluid pressure cylinder 26 to be reversed whereby the ram 24 is moved upwardly to its uppermost position. Returning of the reversing valve 203 causes the gate 31 to be closed.

When the ram 24 has moved upwardly sufficiently to release the limit switch 214, the eject switch 211 may be released whereby the circuit associated with the limit switch 208 is returned to its normal state. Thus, a signal will be applied to the solenoid 209 to move the reversing valve 201 leftwardly whereby pressure fluid flowing therethrough causes upward movement of the ram 18 and downward movement of the ram 24. Also a signal is impressed on the terminals Y—Y to actuate the solenoid 229 which reverses the reversing switch 227 to reverse the motor 4 to rotate the screw 3 oppositely to the direction indicated in the drawing. Should it be so desired, the system may be shut down at this time by turning off all voltage and pressure fluid sources. If however, operation is to be continued, plastic material from the hopper 20 is now allowed to enter the ram cylinder 17. Thus, when the ram 24 hits its lowermost point, the limit switch 214 will be closed to activate the solenoid 216 to move the reversing valve 201 to its position shown in the drawings whereby the ram 24 is urged upwardly and the ram 18 is urged downwardly. Closing of the limit switch 214 impresses the voltage on the terminals X—X to actuate the solenoid 228 to return the rotation of the motor to the direction shown in the drawings. Thus, downward motion of the ram 18 will drive the plastic material contained in the ram cylinder 17 leftwardly through the screw 3 into the ram cylinder 23 as hereinabove described and cycling continues as above described.

Embodiment of FIGURE 2

FIGURE 2 discloses a plasticizing device mechanically similar to that of my application Serial No. 194,274 but which is operated in a totally different manner from that of Serial No. 194,274 to utilize the discoveries of the present invention. The device of FIGURE 2 is briefly described hereinbelow for convenience in reference and to illustrate the adaptability of the method of the present application to a device similar to an existing machine.

A housing 101, having a central opening 102 therein, houses a screw 103 which may discharge its contents through a nozzle opening 105 into a mold 106. A gate 131 may be activated by a fluid pressure cylinder 132 to block said nozzle opening. A feeding device 116, comprising a ram cylinder 117, a ram 118, a fluid pressure cylinder 119, and a hopper 120, feeds the screw 103 at a point remote from the discharge end thereof. All of these components are generally similar to corresponding parts of the embodiment of FIGURE 1 described hereinabove.

However, the embodiment of FIGURE 2 differs from that of FIGURE 1 in that no direct correspondent to the storage device 22 thereof is here provided and in that the screw 103 is reciprocably as well as rotatably driven. The latter is provided for in a manner similar to that illustrated in the aforementioned Serial No. 194,274 and, more specifically, is here accomplished by providing the screw 103 with a rightward extension 141 having an axially sliding gear 142 disposed thereon for rotation therewith. A fluid pressure cylinder 143 reciprocates the screw 103 and a motor 104 drives the sliding gear 142 to rotate said screw independently of its reciprocation.

The embodiment of FIGURE 2 can be caused to carry out the same broad process outlined above in connection with the apparatus of FIGURE 1. In so doing, with the gate closed, and the ram 118 retracted plastic material is introduced into the feeding unit 116. The ram 118 is than caused to advance and the screw 103 caused to rotate. As said screw rotates it is simultaneously retracted either by positive operation of cylinder 143, or by the pressure exerted by the plastic material being fed into the opening 102 by ram 118, so as to provide an accumulation chamber between the leftward end of said screw and the gate 131. When the ram 118 has reached its downward position it may be depressurized or moved upwardly as desired. The screw may be reversed and simultaneously advanced. This will then move plastic material backwardly through said screw and, because of the dam 144 provided in said screw, said plastic material will be directed upwardly again into the cylinder 117, with the ram 118 being moved upwardly by the pressure of the entering plastic material. This procedure may be repeated as often as necessary to obtain the proper amount of the plasticizing of the material.

When the material is fully plasticized, it may then be injected into or through a suitable shaping device, normally a conventional plastic mold 106. This may be accomplished either when a quantity of plastic material is accumulated at the leftward end of the screw 103 by merely advancing the screw 103 leftwardly under pressure 142 in the manner of a ram, or it may be accomplished when plastic material is gathered in the chamber 117 by advancing the ram 118 and driving plastic material through said screw and into the mold 106. If the latter procedure is adopted, said screw may be rotated at a speed to assist movement of the plastic material under pressure from the ram 118, at a lesser speed such that said screw will neither appreciably assist nor oppose such movement, or said screw may be moved at either a slow speed or in a reverse direction to oppose movement of the plastic material therethrough in which case further plasticizing of the material will be obtained as it is driven for the last time through the chamber 102 and into the mold 106.

Suitable control means for any of the alternative forms of operation are easily formulated. For example, should it be desired to eject the plastic material after it has accumulated at the leftward end of the central opening 102, a control system similar to that mentioned in the above-mentioned Serial No. 194,274 may be employed after suitably modifying same to allow the desired number of passages of the material through the screw 103 before ejection. On the other hand, the control system of FIGURE 1 might be here employed after minor modifications including provision of means whereby the screw 103 retracts rightwardly at a rate commensurate with the accumulation of material at the leftward end thereof.

Form of FIGURE 3

In this embodiment of the apparatus aspect of the invention, most of the parts are the same as those used in FIGURE 1. These are identified by numerals identical with those used in FIGURE 1 together with the subscript "a" and therefore need no further description.

The apparatus differs, however, from that illustrated in FIGURE 1 in that the discharge from the housing 1a is at a point between the pressure cylinders 16a and 22a rather than outside thereof as is shown in FIGURE 1 and in that the ends of the chamber 2a preferably are closed by any convenient means such as the bearing baffles 57 and 58 here shown for purposes of illustration.

Thus, in FIGURE 3 there is provided a discharge opening 51 at a point intermediate, preferably midway, between said two feeding devices 16a and 22a which discharges through a suitable platen 52 and into the mold 53. It will be recognized that if desired the mold 53 may be replaced by an extrusion die. The opening 51 is blocked by a gate 54 which is operated by a fluid pressure cylinder 56.

The operation of the apparatus of FIGURE 3 is generally similar to that described in connection with FIGURE 1 in that material may be initially supplied through either of the ram units, here shown as the feeding device 16a, and by suitable operation thereof be passed back and forth between said ram units with said screw 3a rotating as desired alternatively to assist, leave unchanged or oppose such passage of plastic material in whatever pattern or sequence is desired.

Thus, as in the previously described embodiments, by appropriate manipulation of the rams 18a and 24a together with the valve 54, the plastic material may be worked back and forth between the ram units 16a and 22a for as long a period of time as desired, during which time it is subjected to as much agitation by the screw 3a as desired, and then expelled through the opening 51 into the mold 53 or other shaping device.

It will be realized that in this embodiment of the invention it will not be possible to expel from the agitation zone occupied by the screw all of a given body of plastic material during any one cycle and hence this form can be used only where the plastic material is of such stability that it can be held at a plasticizing temperature for more than one cycle of operation of the device and further where it can be subjected to at least two cycles of agitation. In contrast to this, the forms of the invention shown in FIGURES 1 and 2 can expel the entirety of a given plasticizing charge with each cycle of operation and hence will be better adapted for handling more heat sensitive materials. An advantage, however, of the FIGURE 3 form of the apparatus, is that the screw can be supported by bearings such as those shown at 57 and 58 at each end thereof and hence it will be adapted for heavy duty operation, particularly operations involving an extremely stiff plastic.

Any of several control systems may be employed to give the above-described operation, one such control system being that disclosed in connection with the embodiment of FIGURE 1.

*Modification of FIGURE 4*

The apparatus of FIGURE 4 is essentially the apparatus of FIGURE 1 with the leftward ram moved to a position where it is better adapted for acting as an ejection ram than it is in the position shown in FIGURE 1 and with the discharge gate and mold relocated and revised somewhat. Thus, the structure of FIGURE 4 bears much resemblance to the structure shown in Henry application Serial No. 120,268 although the operation performed by the apparatus is totally unlike that of Serial No. 120,268.

In the structure of FIGURE 4 there is provided a housing and screw generally similar to that shown in FIGURE 1, together with a motor and a first feeding device all of which are designated by the same numerals as utilized in FIGURE 1 with the suffix "b" associated therewith and which will accordingly need no further description. However, certain other features differ from the apparatus of FIGURE 1 and will now be described.

The screw 3b discharges into the stem 63 of an essentially T-shaped discharge passageway 62 in a gate housing 61 fixed to the discharge end of the housing 1b. The remaining arms 64 and 66 of the discharge passageway 62 communicate with the open end of a second ram cylinder 67 and with the sprue opening 73 of a conventional plastic mold 74. The ram cylinder 67 contains a ram 68 activatable by a fluid pressure cylinder 69, all of which comprise a storage device 70 which may be identical to the device 22 of FIGURE 1 but which is, as hereinabove described, somewhat differently located on the apparatus than is the device 22. The mold 74 may be identical except in location on the apparatus to the mold 6 of FIGURE 1 and numbers referring to parts thereof are those of FIGURE 1 suffixed with the letter "b." A gate 76 activated by a fluid pressure cylinder 77 and having a beveled upper rightward edge 78 may be deployed to allow material to flow between the central opening 62 and the ram cylinder 67 and simultaneously block the input passage 66 or alternatively may be deployed to open by means of a hole 79 therethrough the passage between said ram cylinder and input passage and to simultaneously seal the discharge end of the central opening 2b.

Comparing the storage device 70 to the device 22 of FIGURE 1 and assuming the gate 76 to be in its retracted position as shown in FIGURE 4, the operation of this embodiment may be identical to that of FIGURE 1 embodiment as hereinabove described until the material is ready for discharge into the mold 74. At this point and referring only to the embodiment of FIGURE 4, the plastic material will be contained in the ram cylinder 67 and the ram 68 will then be in its uppermost position. The gate 76 is then moved rightwardly to seal the central opening 2b and to bring the hole 79 therein into alignment with the passage between the ram cylinder 67 and the input passage 66 to the mold 74. The ram 68 is then forced downwardly to eject the plastic material out of the cylinder 67 and into the mold 74, whereafter the gate 76 may be retracted and another plasticizing and molding cycle may be begun.

Any of several possible control systems may be employed to give the above described operation. For example, the control system of FIGURE 1 may be employed after suitably modifying same to permit ejection from the feeding device 70 rather than from the screw 3b. Thus, a plasticizing cycle can be commenced before the molded part is removed from the mold 74.

For example, FIGURE 6 discloses a control system wherein the plastic material is ejected into the mold in the manner above described, wherein the rams are powered on their upstroke by the pressure fluid cylinders 19b and 69, wherein the screw is emptied completely after each passage of plastic material therethrough, and wherein after ejection the control system is automatically reset to plasticize a new load of plastic material without attention from the operator.

A pressure fluid source S supplies the fluid pressure cylinders 69 and 19b through a reversing valve 241 in opposite phase. The control system shown depends upon double ended rams for feedback of ram positions. Thus, the ram 18b is provided with an extension 246 extending through the upper end wall of the fluid pressure cylinder 19b and having an actuating bar 247 thereon for closing a limit switch 248 when the ram 18b is in its lowermost position. The limit switch 248 is in series with a source of voltage V and a solenoid 249 which is actuatable to move the reversing valve 241 leftwardly to reverse the flow of pressure fluid to the cylinders 69 and 19b. A time delay device D and a pair of terminals Y—Y complete the series circuit. The ram 68 has an extension 252 extending through the upper wall of the fluid pressure cylinder 69 and having an actuating bar 253 thereon for closing a limit switch 254 when the ram 68 is in its lowermost position. The limit switch 254 is in series with a source of voltage V and a solenoid 256 which is actuatable to move the reversing valve rightwardly to its position shown in the drawing. The limit switch 254 is also in series with a process stop switch 251, a delay device D and a pair of terminals X—X.

A pressure fluid source S also supplies gate pressure fluid cylinder 77 through a reversing valve 243. The reversing valve 243 is actuatable leftwardly from its position shown by a solenoid 264 connected in series with a normally open eject switch 266 and a pair of terminals connected to the aforementioned terminals Y—Y. The reversing valve 243 is actuatable rightwardly to its position shown by a solenoid 262 which is in series with a source of voltage V and a normally open reset switch 263. Said reset switch is actuatable by a solenoid 261 which is connected to the aforementioned terminals X—X. The motor 4b is supplied with voltage from a source of voltage V through a reversing switch 267 actuatable to give the motor rotation indicated in the drawing by a solenoid 268 connected to the aforementioned terminal X—X and actuatable to reverse the motor rotation by a solenoid 269 connected to the aforementioned terminals Y—Y hereinabove described.

Assuming the components of the control system to be positioned as shown in FIGURE 6, assuming the voltage and pressure fluid sources can be actuated, and further assuming that the ram cylinder 17b has been charged with plastic material from the hopper 20b, the ram 18b will be moved downwardly and the ram 68 will be moved upwardly by pressure fluid from the source S whereby the plastic material will be forced from the ram cylinder 17b by the ram 18b and into the screw 3b. The combined action of the ram 18b and the screw 3b moves the material leftwardly and into the ram cylinder 67. When the ram 18b reaches its lowermost position, thereby emptying the ram cylinder 17b of plastic material, the actuating bar 247 thereon will close the limit switch 248. The delay device D delays the signal provided thereby until the screw 3b has emptied into the ram cylinder 67 whereupon the delay device D times out and a signal is impressed on the solenoid 249 to move the reversing valve 241 leftwardly whereby the pressure fluid flow to the cylinders 69 and 19b is reversed to raise the ram 18b and lower the ram 68. The terminals Y—Y actuate the solenoid 269 to reverse the switch 267 and thereby reverse the rotation of the motor 4b whereby the screw 3b tends to move material rightwardly. The aforementioned downward movement of the ram 68 drives the material out of the ram cylinder 67 and the aforementioned reverse rotation of the screw carries such material back into the ram cylinder 17b.

When the ram 68 reaches its lowermost position the actuator block 253 will close the limit switch 254. The delay device D in series therewith delays signaling until the screw 3b has emptied itself into the ram cylinder 17b whereupon said delay device times out and a signal is impressed upon a solenoid 256 to return the reversing valve 241 to its original position whereby the ram 68 is moved upwardly and the ram 18b is moved downwardly as hereinabove described. Simultaneously with the actuation of the solenoid 256 the solenoid 268 is actuated through the terminals X—X to return the motor 4b to its original direction of rotation. Cycling continues in the above described manner until the operator elects to eject the plastic material into the mold 74 at which time the operator or suitable automatic means, closes the eject switch 266. Closing of the eject switch 266 has no effect until the ram 18b, in its normal cycling, closes the limit switch 248. After the delay device D in series therewith times out, a signal from the terminals Y—Y actuates the solenoid 264 to move the reversing valve 243 leftwardly from its position shown whereby to move the gate 76 rightwardly (FIGURE 4) by means of the fluid pressure cylinder 77. Thus, such movement of the gate 76 occurs after the plastic material has been moved into the ram cylinder 67. Such actuation of the gate 76 seals the discharge end of the central chamber 2b whereby material ejected from the ram cylinder 67 as hereinbelow described cannot re-enter the central opening 2b but rather must travel through the passages 64 and 66 (FIGURE 4) and into the mold 74.

Also, timing out of timing device D in series with the limit switch 248 causes leftward movement of the reversing valve 241 to reverse the flow of pressure fluid to the fluid pressure cylinders 69 and 19b whereby the ram 18b is caused to move upwardly and the ram 68 is caused to move downwardly to expel the plastic material contained in the ram cylinder 67 into the mold 74. As the ram 68 reaches its lowermost position, the limit switch 254 is closed and soon thereafter the automatic reset solenoid 261 is actuated through the terminals X—X to close the reset switch 263 whereby the solenoid 262 is actuated to return the reversing valve 243 rightwardly to its normal position. Upon such return, the gate 76 (FIGURE 4) moves leftwardly to open the passage between the ram cylinder 67 and the central opening 2b and to close the passageway between the ram cylinder 67 and mold 74. Also, timing out of the delay device D in series with the limit switch 254 causes the solenoid 256 to move the reversing valve 241 rightwardly for moving the ram 68 upwardly and the ram 18b downwardly and energizes the solenoid 268 from the terminals X—X to return the rotation of the motor 4b to its original direction.

If it had been elected to continue operation of the device, plastic material from the hopper 20b would have been placed in a ram cylinder 17b when the ram 18b was in its topmost position above described, whereby cycling continues in the manner hereinabove described. If, on the other hand, it had been elected to stop the operation of the machine, the process stop switch 251 would have been opened with the closing of the eject switch 266 above described whereby actuation of the solenoid 256 after ejection would be prevented for as long a period of time as the switch 251 is held open. Thus, the mechanism might be shut down at such point by shutting off the sources S of pressure fluid and the sources V of voltage. Alternately, the operation of the machine might merely be suspended for a period of time by holding the switch 251 open. Loading of the cylinder 17b with a fresh charge from the hopper 20b may easily be accomplished automatically by any convenient means not shown which might be advantageously actuated by the automatic reset solenoid 261.

In the above discussion, the rotational speed of the screw has been assumed constant. However, it is fully contemplated that the speed of the screw may be varied during the plasticizing of a quantity of plastic material. Where it is desired that the plastic material be at first agitated only very little and later be agitated to a greater extent, the screw may initially be rotated at speed which neither impedes nor assists the movement of plastic material therethrough. The speed of the screw may thereafter be changed either in a continuous or stepwise manner to either accelerate or impede the flow of material therethrough and thereby increase the agitation of the plastic mtaerial. On the other hand, the screw speed may be set initially for a considerable initial agitation of the material and may thereafter be suitably changed to decrease the amount of agitation.

Suitable programming means of any desired type may be included in the control system for a plasticizing machine utilizing the method of this invention for varying the speed of rotation of the screw as discussed above. For example, with the control system shown in FIGURE 6, the setting of a variable resistance placed in series with the motor lead might be changed by a predetermined amount in response to each actuation of one of the limit switches employed.

While a particular preferred method and apparatus embodying the invention have been described above for purposes of illustration, the invention fully contemplates any changes therein as lie within the scope of the appended claims.

What is claimed is:

1. In a process for molding plastic material, the steps consisting of: providing a plasticizing chamber having fixed wall means and screw means rotatably supported within said chamber and defining with said wall means a tortuous path therethrough; first and second variable volume chambers communicating with said path at spaced points therealong, each variable volume chamber containing a ram movable therein to vary the volume in said volume chambers; and a molding chamber connectible to said path;
  placing plastic material in the first volume chamber and causing the ram therein to move a quantity of said material from said first volume chamber into said path;
  causing all of said quantity of material to move in one direction along said path and thence into said second volume chamber;
  subjecting said material to simultaneous frictional heating, agitation and compression as it moves along said path through said plasticizing chamber to raise the temperature and reduce the viscosity of the material;
  causing the ram in the second volume chamber to move all of said quantity of material from said second volume chamber back into said path;
  causing said quantity of material to move along said path in the opposite direction and thence into said first volume chamber, and again subjecting said material to frictional heating, agitation and compression;
  repeating the foregoing steps until said quantity of material reaches a desired viscosity and temperature for molding; and
  conducting the quantity of plasticized material from said path to said molding chamber.

2. A process according to claim 1, wherein said screw means is axially reciprocable and said second volume chamber is defined by one end of said plasticizing chamber, and including the steps of:
  moving said screw means axially toward said one end of said plasticizing chamber as said quantity of plastic material is moved along said path in said opposite direction; and
  thereafter moving said screw away from said one end of said plasticizing chamber so that said quantity of material can move in said one direction and into said second volume chamber.

3. A process according to claim 1, including the steps of:
  rotating said screw means in one rotational direction as said quantity of plastic material is moved in said one direction along said path; and
  rotating said screw means in the opposite rotational direction as said plastic material is moved along said path in said opposite direction.

4. A process according to claim 2, including the steps of:
  rotating said screw means and simultaneously moving same toward said one end of said plasticizing chamber as said quantity of plastic material is moved along said path in said opposite direction; and
  thereafter rotating said screw means and moving same away from said one end of said plasticizing chamber so that said quantity of material is moved in said one direction and into said second volume chamber.

5. A process according to claim 1, including the step of rotating said screw means in said plasticizing chamber while moving said quantity of plastic material from one volume chamber to the other so as to agitate and plasticize said plastic material.

6. A process according to claim 1, including the step of moving the quantity of plastic material through an elongated, narrow, substantially spiral path as it passes through the plasticizing chamber to effect heating and plasticization of the plastic material.

References Cited by the Examiner

UNITED STATES PATENTS

| | | | |
|---|---|---|---|
| Re. 23,948 | 2/1955 | Fuller | 264—329 |
| 90,766 | 6/1869 | McCelland | 18—2 |
| 2,156,396 | 5/1939 | Macklin | 264—329 |
| 2,356,081 | 8/1944 | Novotny | 264—329 |
| 2,359,013 | 9/1944 | Tucker | 264—329 |
| 2,406,403 | 8/1946 | Rogers | 18—2 |
| 2,862,240 | 12/1958 | Strauss | 18—30 |
| 2,865,051 | 12/1958 | De Mattia | 18—30 |
| 2,944,288 | 7/1960 | Sherman | 264—329 |
| 3,029,471 | 4/1962 | Adams et al. | 264—329 |
| 3,078,512 | 2/1963 | De Haven | 18—2 |
| 3,090,994 | 5/1963 | Stenger | 264—329 |
| 3,192,299 | 6/1965 | Hendry | 264—329 |

FOREIGN PATENTS 1,276,593  10/1961  France.

ROBERT F. WHITE, *Primary Examiner.*

ALEXANDER H. BRODMERKEL, *Examiner.*

J. R. DUNCAN, R. B. MOFFITT,
*Assistant Examiners.*